STREET CLEANING APPARATUS

Filed Aug. 12, 1963 3 Sheets-Sheet 1

INVENTORS
BEN DANEMAN
HOWARD E. PAULSON
BY
Lieber & Nilles
ATTORNEYS

STREET CLEANING APPARATUS

Filed Aug. 12, 1963 3 Sheets-Sheet 2

INVENTORS
BEN DANEMAN
HOWARD E. PAULSON
BY
Lieber & Nilles
ATTORNEYS

INVENTORS
BEN DANEMAN
HOWARD E. PAULSON
BY
Lieber & Nilles
ATTORNEYS

United States Patent Office 3,193,867
Patented July 13, 1965

3,193,867
STREET CLEANING APPARATUS
Ben Daneman, Milwaukee, and Howard E. Paulson, Waukesha, Wis., assignors to Central Engineering Company, Inc., Milwaukee, Wis., a corporation of Wisconsin
Filed Aug. 12, 1963, Ser. No. 301,325
1 Claim. (Cl. 15—314)

The present invention relates generally to improvements in the art of cleaning streets, and relates more particularly to the provision of an improved street cleaning apparatus adapted to pick up and collect debris as well as to sprinkle and wash the street or roadway.

Mobile apparatus for picking up and removing trash, leaves and litter from streets and highways or the like have, of course, been heretofore proposed and used with varying degrees of success. One of the most popular types of such debris collectors in use today employs the use of vacuum and consists generally of a large truck mounted tank having a flexible nozzle attachable thereto and vacuum creating means associated therewith, the tank being tiltable for load dumping purposes. An example of such vacuum-type debris collector may be found in United States Patent No. 3,052,908, dated September 11, 1962.

In addition, it has been common practice for many years to provide mobile street sprinkling apparatus for settling dust, flushing dirt and the like. Such apparatus comprises generally a large tank rigidly mounted on a truck chassis for receiving a supply of cleansing water, and means for conducting the water from the tank and for distributing the same under pressure and in the form of a spray over the roadway.

It is an object of the present invention to provide a single mobile apparatus which is extremely flexible in its adaptations and which serves the dual functions of the debris collector and street sprinkler.

Another object of this invention is to provide an improved street cleaning apparatus which embodies a tiltable sealed tank mounted on an engine driven vehicle chassis and readily convertible from vacuum tank type use for picking up and collecting debris to water supply and distributing type use for sprinkling and flushing streets and roadways.

More particularly, it is an object of the present invention to provide an engine driven vehicle with an enclosed tiltable tank having one or more upper side intake openings for detachably receiving a flexible pick-up nozzle and also having a lower liquid conducting and distributing conduit and spray nozzles communicating with the interior through the bottom wall, and means on the vehicle for selectively and interchangeably either creating a vacuum within the tank and through the nozzle or conducting liquid under pressure therefrom through the conduit.

These and other additional objects and advantages of the invention will become apparent from the following detailed description.

A clear conception of the features constituting the present invention and of the mode of constructing and of utilizing a typical street cleaning apparatus embodying the improvements may be had by referring to the drawings accompanying and forming a part of this specification wherein like reference characters designate the same or similar parts in the several views.

FIG. 1 is a side view of a mobile street cleaning apparatus embodying the present invention;

Figure 4:
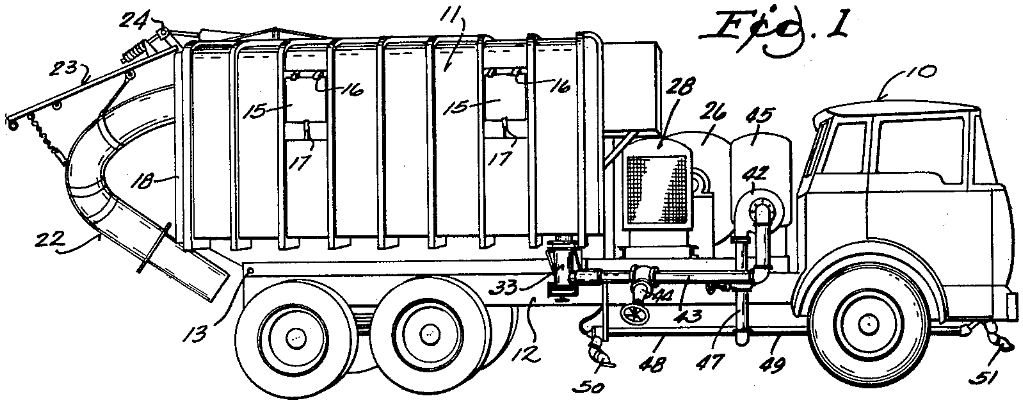
FIG. 4 is a transverse vertical section through the tank taken along the line 4—4 of FIG. 3.

While the invention has been shown and described herein as being especially advantageously embodied in a street cleaning apparatus having a tank of a particular configuration provided with a plurality of side and rear openings for interchangeably receiving a flexible pickup nozzle carried by a power boom and with a liquid discharge conduit connected in a particular manner to a centrifugal pump for conducting flushing fluid to a number of spray heads located in certain areas with respect to the vehicle chassis, it is not desired or intended to thereby unnecessarily limit the scope or utility of the invention by reason of such specific embodiment. It is also contemplated that certain specific descriptive terminology used herein shall be given the broadest possible interpretation consistent with the disclosure.

Referring now to the drawings, the street cleaning apparatus shown therein as embodying the invention comprises, in general, an engine driven truck or similar self-propelled vehicle 10 having a fully enclosed and self-contained tank or body 11 suitably secured to the vehicle frame 12, the tank 11 being pivotally mounted on a transverse axis 13 in order to permit the same to be tilted or tipped rearwardly about the axis 13 to discharge its load.

The tank 11 is provided with a plurality of side and rear openings adapted to be closed by doors 15 which may be hinged as at 16 and latched as at 17 in a suitable manner to retain the same in securely closed condition when the respective opening is not in use. The rear of the tank is provided with a large dumping door or gate 18 hinged at its upper edge as at 19 and normally secured by a suitable latch 20 at its lower edge when the tank is in use for either its debris collecting function or its water distributing function.

A flexible nozzle 22 which may be in the form of a large diameter corrugated hose is interchangeably attachable to the side and rear tank openings as more fully described in U.S. Patent No. 3,052,908 hereinabove referred to, and this hose 22 is conveniently carried by the arm 23 of a power boom 24 also fully described in my issued patent. It is thus apparent that the nozzle 22 may be placed in communication with any desired one of the side or rear tank openings, and the openings which are not in use are closed by their respective doors 15.

During its debris pick-up and collection service, a high vacuum is maintained in the tank 11 by means of a high pressure blower 26 driven through belts 27 or the like by an internal combustion engine 28, the blower being in communication with the interior of the tank 11 through a duct 29. By means of the engine driven blower 26, a high vacuum may be maintained within the tank 11 and suction is provided in the nozzle 22 for permitting its use as a vacuum cleaner for picking up debris of all types from the street or roadway and conducting the same to the interior of the tank 11, and when the tank 11 is full or when the vacuum pickup operation has been completed, the load may be transported to a desired area and dumped in an obvious manner by tilting the tank body 11 rearwardly about the axis 13 with the rear door 18 in open condition.

The bottom wall 31 of the tank 11 is provided with a drain opening and conduit 32 communicating with a sump 33 containing a filter element 34 and having the upper end thereof provided with an annular rubber ring 35 adapted to seat against an annular flange 36 at the lower end of the drain conduit 32 to provide an effective seal and the tank 11 is in lowered and operative position as shown. Also, the lower end of the sump is closed by a closure plate 38 and a sealing gasket 39, the plate 38 being normally retained in firmly seated condition to compress the gasket 39 against the lower end of the sump as by means of a clamp 40 which is removable in order to obtain access to the screen 34.

The sump 33, in turn, is in communication with the suction side of a centrifugal pump 42 or the like by way of a conduit 43 having a suitable manual control valve 44 therein for selectively shutting off and turning on the flow through the conduit 43. The centrifugal pump 42 or other pumping device may be driven in a suitable manner either by means of a separate engine or motor 45 as shown, or the pump may be driven from the same power source 28 as drives the blower 26.

The pump 42 discharges into a conduit 47 which leads through branches 48, 49 to a number of spray heads or discharge nozzles 50, 51 respectively, and these spray heads or nozzles are adapted to direct the flushing liquid under pressure conducted from the tank 11 via conduit 43, pump 42, and conduits 48, 49 over and across the roadway being traversed by the vehicle 10 during the street sprinkling operation. The discharge conduit 47 also includes a manually operable valve 51 for selectively opening and closing the same at the will of the operator.

The stand pipe or drain 32 may be protected against clogging as by means of a cage like closure 53, and the sump assembly 33 may be rigidly attached to one of the vehicle frame members as by means of brackets 54 bolted to the frame and the sump. The conduit and its branches may likewise be affixed to the vehicle frame 12 in a suitable manner as by means of tie rods 55, 56, and the clamp 40 may be tightened or loosened as by means of a jack screw 57.

Figure 5:
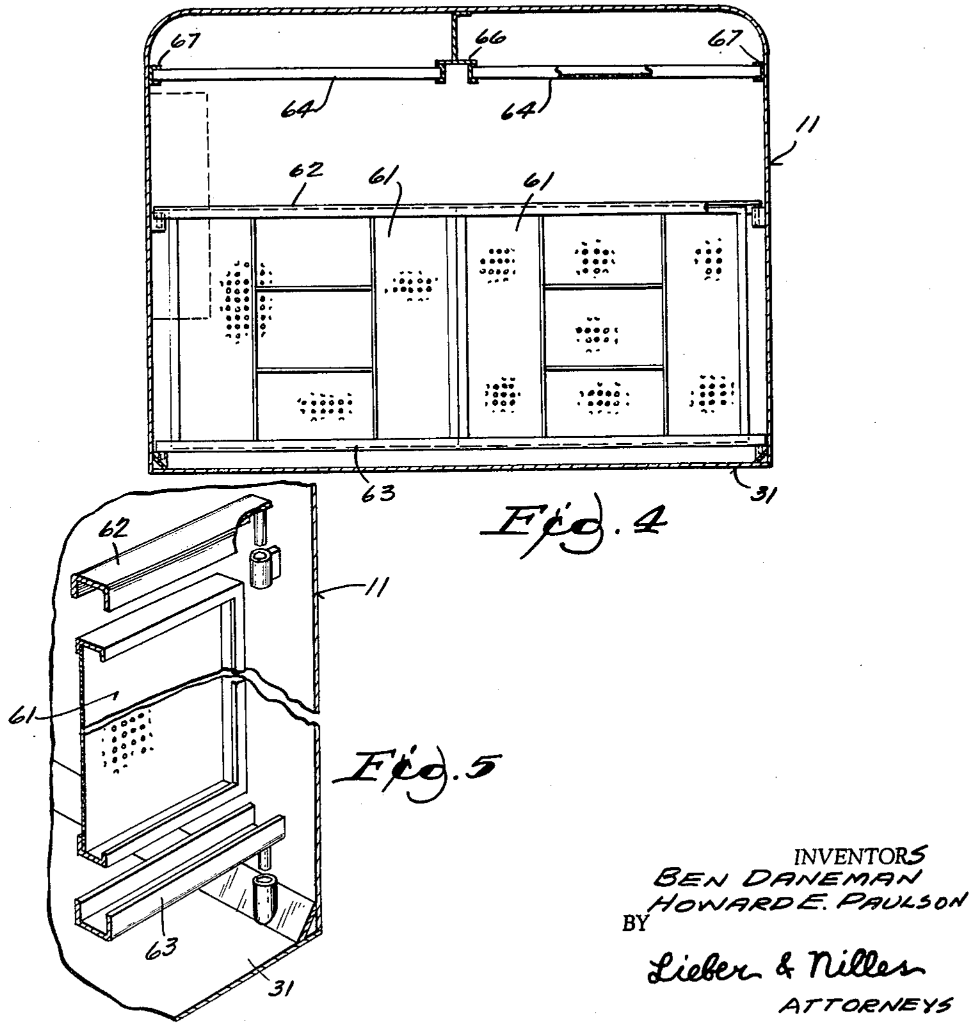
FIG. 5 is a fragmentary exploded perspective view of one of the internal baffles and its supporting structure.
Figures 2, 3:
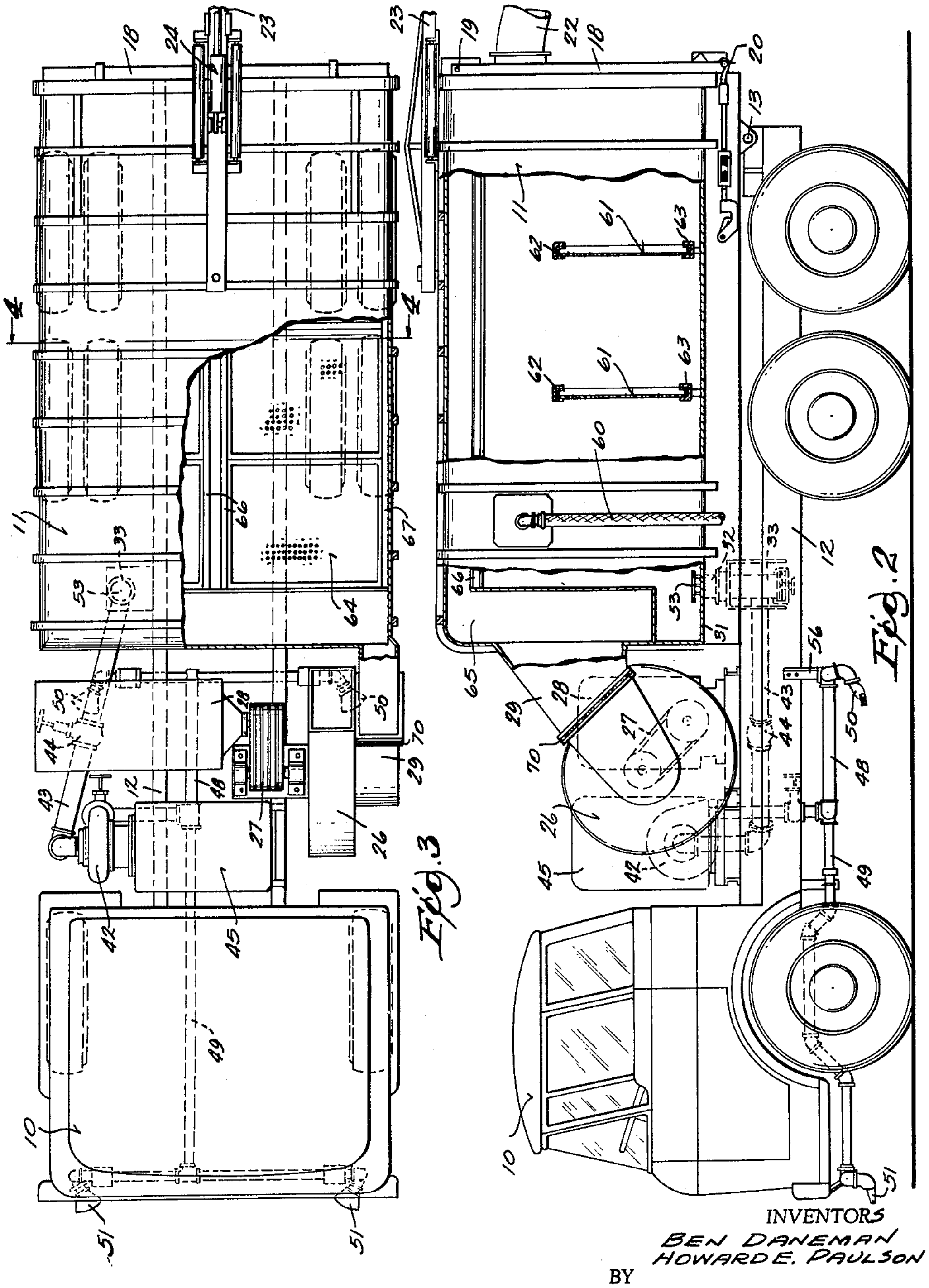
FIG. 2 is a somewhat enlarged fragmentary side elevational view of the device with portions of the tank broken away and parts being shown in section.
FIG. 3 is a similarly enlarged fragmentary plan view of the assemblage with portions again being broken away and shown in section.
Figures 6, 7, 8:
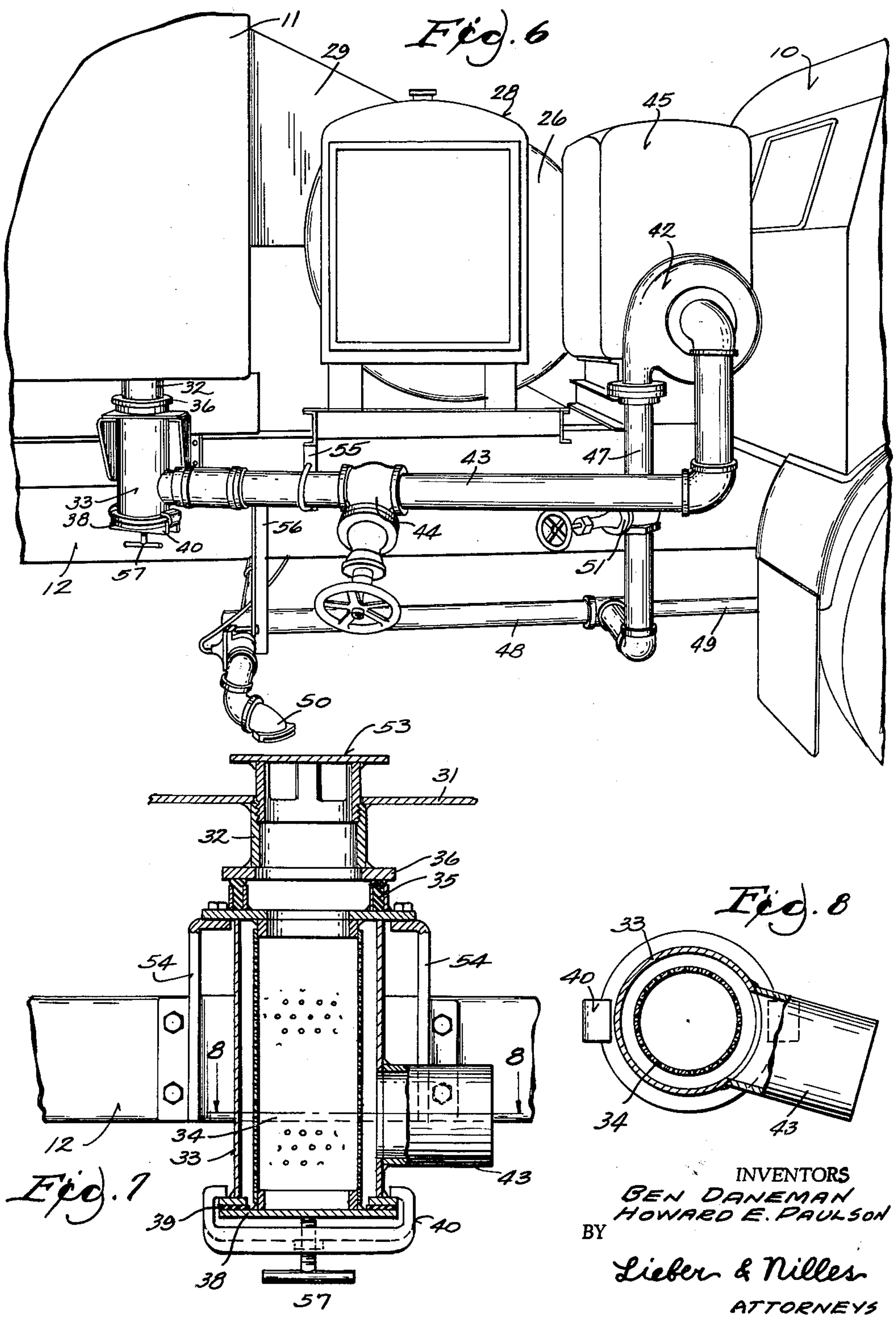
FIG. 6 is a further enlarged fragmentary perspective view of the liquid pumping apparatus, distributing conduits, valves and connections.
FIG. 7 is an additionally enlarged vertical fragmentary section through the sump and liquid filter and seal assembly.
FIG. 8 is a partial section through the sump taken along the line 8—8 of FIG. 7.

To prevent undesirable and excessive splashing of water supplied to the tank 11 as by way of a supply hose 60 or the like through one of the upper side openings as shown in FIG. 2, a series of vertical baffles 61 may be provided, and as shown in FIGS. 4 and 5, these baffles are in the form of performated plates and may be conveniently supported between upper and lower bracket members 62, 63 respectively, at least the upper bracket member 62 being readily removable so as to, in turn, permit removal of the perforated baffle plates 61. Also, the upper portion of the tank interior is preferably provided with horizontal screens 64 extending from the vacuum compartment 65 to the rear of the tank, and these screens 64 may be suitably supported as by means of brackets 66, 67 secured to the upper and side portions respectively of the tank interior. Since the tank 11 must be as air and water tight as possible both for its purpose as a debris collector and as a water tank for sprinkling system, suitable provision should also be made for tightly sealing the rear access door 18 and for retaining the same in closed condition during normal use other than those periods during which the tank is being emptied by dumping.

From the foregoing detailed description, it is apparent that the present invention contemplates the provision of a single appartus which is readily adaptable for use either as a vacuum type debris pickup and collecting device or as a street sprinkling and flushing device, thus eliminating the need for separate vehicles for such purposes. When in use as a vacuum pick-up and collecting device, the nozzle 22 is connected to a selected one of the side or rear openings with the other openings being closed by their respective closures 15. The blower 26 is then placed in operation as by operation of the engine 28, and the vehicle 10 is driven along the roadway while the nozzle 22 is manipulated to pick up debris. The blower 26 is, of course, operatively connected with the interior of the tank 11 through the compartment 65 and the debris is sucked into the interior of the tank below the horizontal screens 64. The load may then be dumped in an obvious manner by mererly opening the latch 20 for the rear door 18 and then tilting the tank 11 about its axis 13 in a known manner, and the suction conduit 29 from the blower to the tank is formed of two sections sealed at 70 to permit the tank to be tilted about its axis 13.

In order to thereafter use the apparatus for street sprinkling purposes, the baffles 61 are preferably first placed in position, the rear door 18 is closed and latched, and the nozzle 22 is connected to either the rear opening or to one of the side openings as desired but is supported in inactive position by the power boom 23, 24. The tank 11 may then be supplied with water as by means of the hose 60 through one of the side openings in the tank, and to operate the sprinkling system, the pump 42 is placed into operation as by means of the power source 45. With the valves 44, 51 open, water is pumped from the tank interior through the sump 33 and through the conduits 43, 47, 48, 49 and is dispersed by way of the spray heads or nozzles 50, 51. In the event it becomes necessary to clean the screen 34 of the sump, the jack screw 57 is first backed off and the clamp 40 and lower closure 38 are removed along with the screen 34 which may, of course, be readily replaced after cleaning. The improved devices have, in fact, gone into actual commercial use and have proven highly satisfactory, and the annular seal 35 provided between the lower end of the stand pipe or drain 32 and the upper end of the sump 33 has proven highly effective in preventing air and water leakage while permitting free tilting of the tank or body 11 without need for mechanical fastening means.

Various modes of carrying out the invention are contemplated as being within the scope of the following claim particularly pointing out and distinctly claiming the subject matter which is regarded as the invention.

We claim:

Combined vacuum pick-up and water-flushing street cleaning apparatus comprising, a self-propelled vehicle having auxiliary power means mounted thereon and a closeable tank having a closeable rear dump door, means for mounting said tank at the rear of said vehicle about a transverse pivot axis for dumping material rearwardly from said tank and out said dump door, a blower mounted on said vehicle and driven by said power means, a duct placing said blower in communication with said tank, said duct being formed in two separate and sealable sections to permit automatic separation thereof when said tank is dumped and sealed therebetween when said tank is not tilted, a vacuum pick-up nozzle detachably secured to said tank, a sump fixed to said vehicle and located beneath the bottom of said tank, and spaced a distance forward of said pivot axis, a stand pipe fixed to and extending downwardly from said tank bottom and terminating at its open lower end in an annular flange, said sump having an upper open end adapted to be in sealing engagement with said flange and in fluid receiving communication with said stand pipe and said tank when the latter is not tilted, said flange and sump being in abutting relationship and automatically separable when said tank is tilted, a fluid pump on said vehicle and having a suction side and a pressure discharge side, said pump being connected to said power means and driven thereby, a conduit placing said sump in fluid communication with the suction side of said pump, spray nozzles fixed to said vehicle and in fluid receiving communication with the discharge side of said pump, whereby the latter sucks fluid from said tank through said sump and conduit and forceably ejects it out said nozzles, and means for selectively controlling flow in said vacuum nozzle and water flushing means.

References Cited by the Examiner

UNITED STATES PATENTS

| | | | |
|---|---|---|---|
| 274,060 | 2/83 | Vizelich | 239—172 |
| 983,352 | 2/11 | Cox | 210—435 X |
| 1,322,359 | 11/59 | Shelly | 239—172 |
| 1,388,510 | 8/21 | Cartwright | 239—148 X |
| 1,560,612 | 11/25 | Sims | 15—340 X |
| 1,969,674 | 8/34 | Anderson-Smedberg | 15—230 |
| 3,011,206 | 12/61 | Breither | 15—340 X |
| 3,052,908 | 9/62 | Daneman | 15—340 |

FOREIGN PATENTS

| | | |
|---|---|---|
| 259,402 | 10/26 | Great Britain. |

WALTER A. SCHEEL, *Primary Examiner.*